(12) United States Patent
Tsai et al.

(10) Patent No.: US 7,583,439 B2
(45) Date of Patent: Sep. 1, 2009

(54) WIDE-ANGLE AND BROADBAND POLARIZATION CONVERTER

(75) Inventors: Chang-Ching Tsai, Winter Park, FL (US); Shin-Tson Wu, Oviedo, FL (US); Wang-Yang Li, Xinhua Town (TW); Chung-Kuang Wei, Taipei (TW)

(73) Assignees: University of Central Florida Research Foundation, Inc., Orlando, FL (US); Chi Mei Optoelectronics Corp., Tainan (CN)

( * ) Notice: Subject to any disclaimer, the term of this patent is extended or adjusted under 35 U.S.C. 154(b) by 146 days.

(21) Appl. No.: 11/836,351

(22) Filed: Aug. 9, 2007

(65) Prior Publication Data
US 2009/0040608 A1 Feb. 12, 2009

(51) Int. Cl.
*G02B 5/30* (2006.01)
(52) U.S. Cl. .................................. 359/486; 359/572
(58) Field of Classification Search .............. 359/486
See application file for complete search history.

(56) References Cited

U.S. PATENT DOCUMENTS

| | | | |
|---|---|---|---|
| 4,040,727 | A | 8/1977 | Ketchpel |
| 4,090,219 | A | 5/1978 | Ernstoff et al. |
| 4,093,356 | A | 6/1978 | Bigelow et al. |
| 4,572,616 | A | 2/1986 | Kowel |
| 4,720,173 | A | 1/1988 | Okada et al. |
| 4,870,396 | A | 9/1989 | Sheilds |
| 5,071,229 | A | 12/1991 | Oaki et al. |
| 5,150,234 | A | 9/1992 | Takahashi et al. |
| 5,499,127 | A | 3/1996 | Tsubota et al. |
| 5,699,133 | A | 12/1997 | Furuta |
| 5,886,762 | A | 3/1999 | Lee et al. |
| 5,919,606 | A | 7/1999 | Kazlas et al. |
| 6,014,188 | A | 1/2000 | Yamada et al. |
| 6,020,941 | A | 2/2000 | Ma |
| 6,064,523 | A | 5/2000 | Budd et al. |

(Continued)

OTHER PUBLICATIONS

A. Takaeda, et al., "41.1: A Super-High Image Quality Multi-Domain Vertical Alignment LCD by New-Rubbing-Less Technology", SID col. 29, 1998, p. 1077. Abstract Only.

(Continued)

*Primary Examiner*—Lee Fineman
(74) *Attorney, Agent, or Firm*—Brian S. Steinberger; Phyllis K. Wood; Law Offices of Brian Steinberger, P.A.

(57) ABSTRACT

Apparatus and methods for a polarization converter comprising a polarization beam splitter for receiving an input light beam and allows a transverse magnetic to pass through the polarization beam splitter and reflects a transverse electric wave and a diffraction grating having a reflectivity and polarization convertible grating for receiving the transverse electric wave reflects back a reflected transverse electric wave having a polarization rotation. The broadband wide-angle polarization beam splitter can be alternative optical elements such as a prism or an optical device having multi-layered films. The diffraction grating can be a diffraction grating having alternating parallel protrusions and recesses, metallic diffraction grating, metal-coated diffraction grating, metal-coated multi-layered diffraction grating, non-metallic reflective material surface grating, volume grating, a multi-layer grating, diffractive grating having sub-wavelength grating periods or diffractive grating having multi-orders diffraction gratings. The diffraction grating can have alternative shapes such as binary, trapezoidal, sinusoidal, parabolic, triangular and Gaussian.

20 Claims, 14 Drawing Sheets

U.S. PATENT DOCUMENTS

| | | | |
|---|---|---|---|
| 6,124,971 | A | 9/2000 | Ouderkirk et al. |
| 6,256,010 | B1 | 7/2001 | Chen et al. |
| 6,281,952 | B1 | 8/2001 | Okamoto et al. |
| 6,295,109 | B1 | 9/2001 | Kubo et al. |
| 6,330,047 | B1 | 12/2001 | Kubo et al. |
| 6,341,002 | B1 | 1/2002 | Shimizu |
| 6,424,398 | B1 | 7/2002 | Taniguchi |
| 6,466,290 | B2 | 10/2002 | Kim et al. |
| 6,522,380 | B2 | 2/2003 | Lee et al. |
| 6,977,702 | B2 | 12/2005 | Wu |
| 7,158,201 | B2 | 1/2007 | Kim et al. |
| 7,164,284 | B2 | 1/2007 | Pan et al. |
| 2008/0165296 | A1* | 7/2008 | Kim et al. ............... 349/15 |

OTHER PUBLICATIONS

Y. Kume, et al., "41.4: Advanced ASM Mode (Axially Symmetric Aligned Microcell Mode): Improvement of DisplayPerformances by Using Negative Dielectric Liquid Crystal", SID vol. 29, 1998, p. 1089. Abstract Only.

Yoshio Koike, et al., "Super High Quality MVA-TFT Liquid Crystal Displays", Fujitsu Sci. Tech. J., 35, Dec. 5, 1999, pp. 221-228.

N. Konforti, et al. "Phase-only modulation with twisted nematic liquid-crystal spatial light modulators", Optics Letters, vol. 13, No. 3, Mar. 1988, pp. 251-253.

J.S. Patel, et al., "Electrically tunable and polarization insensitive Fabry-Perot etalon with a liquid-crystal film", Applied Physics Letters, vol. 58, No. 22, pp. 2491-2493.

J.S. Patel, et al., "Polarization insensitive tunable liquid-crystal etalon filter", Applied Physics, Lett., 59, Sep. 1991, pp. 1314-1316.

Zhan He, et al., "Cylindrical Liquid crystal lens and its applications in optical pattern correlation Systems", Jpn. J. Appl. Phys., vol. 34, 1995, pp. 2392-2395.

Mao Ye, et al., "Transient Properties of a liquid-crystal microlens", Jpn J. Appl. Phys., vol. 40, 2001, pp. 6012-6016.

Hongwen Ren, et al., "Inhomogeneous nanoscale polymer-dispersed liquid crystals with gradient refractive index", Applied Physics Letters, vol. 81, No. 19, Nov. 4, 2002, pp. 3537-3539.

Seiji Fukushima, et al., "Ferroelectric liquid-crystal spatial light modulator achieving bipolar Image Operation and cascadability," Applied Optics, vol. 31, No. 32, Nov. 10, 1992, pp. 6859-6868.

M.F. Schiekel, et al., "Deformation of Nematic Liquid Crystals with Vertical Orientation in Electrical Fields," Applied Physics Letters, vol. 19, No. 10, Nov. 15, 1971, pp. 391-393.

Fujimori, Kohichi, et al., "53.3: New Color Filter Structures for Transflective TFT-LCD", Sharp Corporation, Display Technology Development Group, 2002, SID Digest International Symposium, pp. 1382-1385.

Lee, Baek-Woon, et al., "40.5L: Late-News Paper: TFT-LCD with RGBW Color System", Samsung Electronics Corp., in Proceeding of International Display Manufacturing Conference 2003, SID Digest, pp. 212-215.

Shin-Tson Wu and Deng-Ke Yang, "Reflective Liquid Crystal Display", John Wiley & Sons, LTD., 2001, Chapter 3, pp. 68-70, Chapter 4, pp. 98-104.

S.T. Wu, "Nematic liquid crystal modulator with response time less than 100 µs at room temperature," Appl. Phys. Lett., vol. 57, 1990, p. 986. Abstract Only.

\* cited by examiner

Fig. 9a
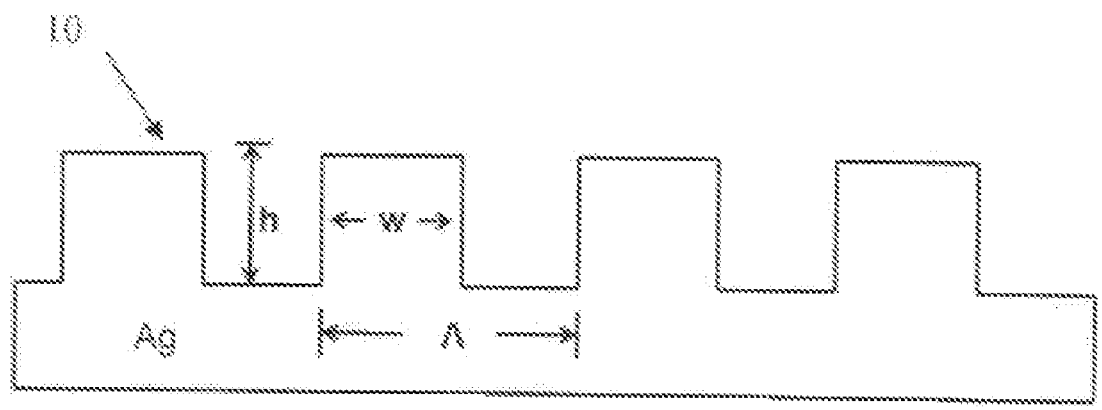
Metal: Silver
Width: W = 70 nm
Period: Λ = 200 nm
Height: h = 135 nm
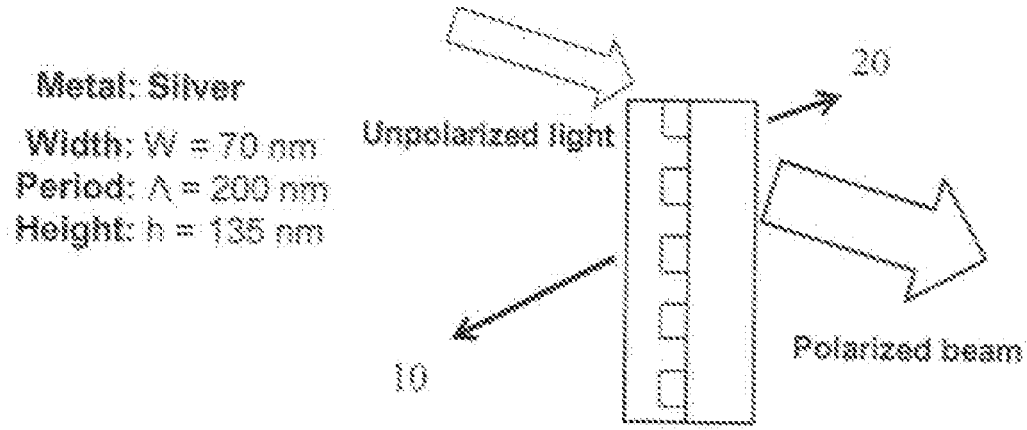
Fig. 9b Fig. 10a
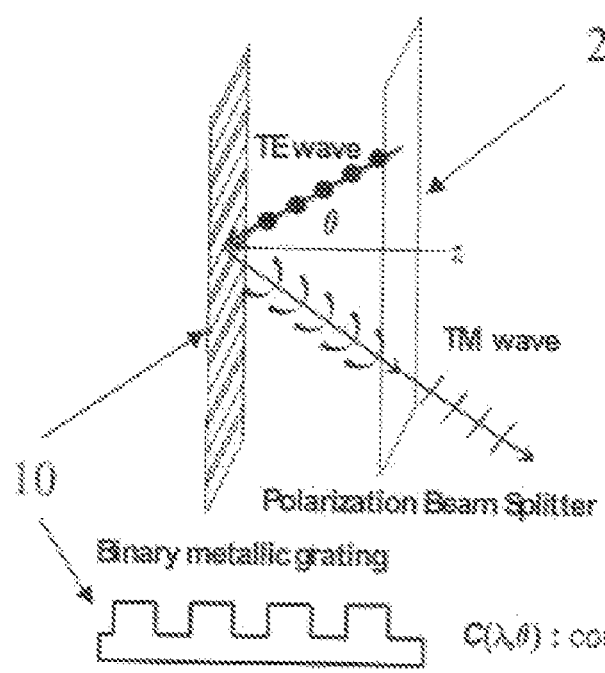
Fig. 10b
Fig. 10c
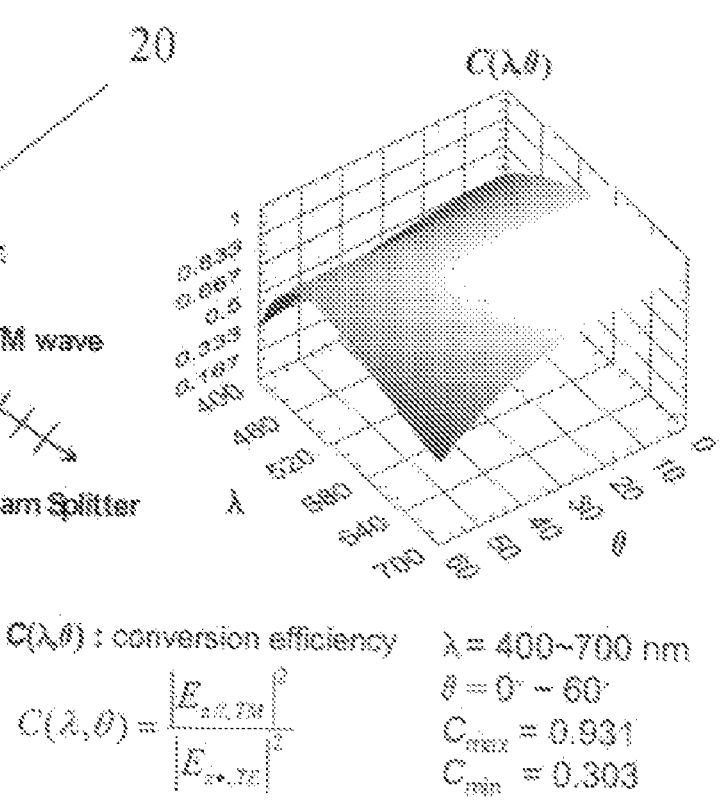

Fig. 11a
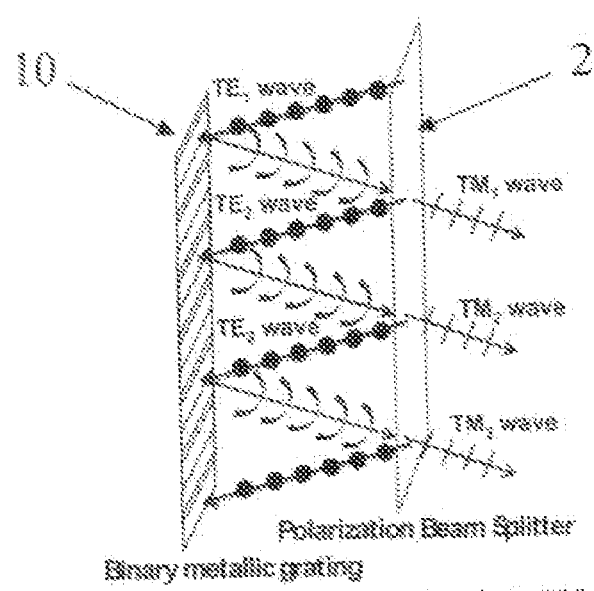
Fig. 11b
Fig. 11c
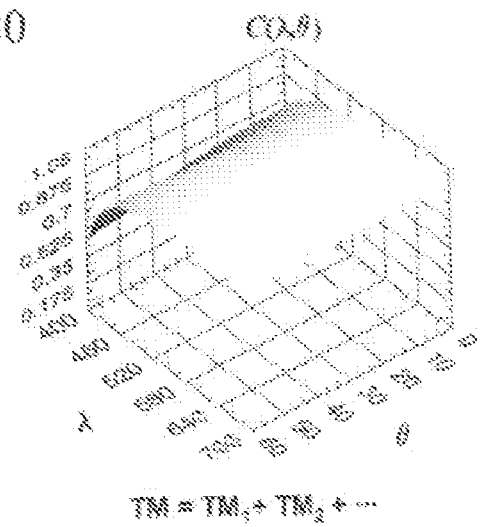

Metal : Silver

Higher width: $w_H$ = 60 nm
Lower width: $w_L$ = 100 nm
Period: $\Lambda$ = 200 nm
Height: h = 110 nm $C(\lambda,\theta)$: conversion efficiency $$C(\lambda,\theta) = \frac{|E_{zz,TM}|^2}{|E_{zz,TE}|^2}$$

$\lambda = 400\sim700$ nm
$\theta = 0°\sim 60°$
$C_{max} = 0.862$
$C_{min} = 0.287$ Fig. 14a
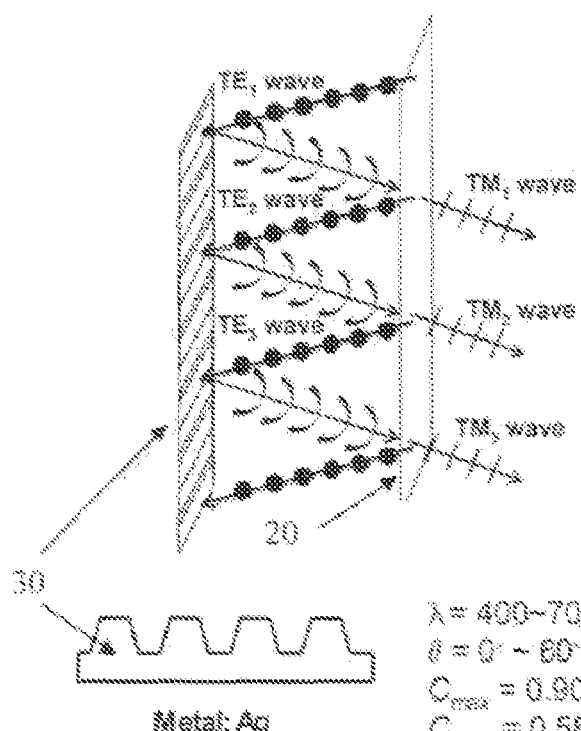
Fig. 14b
Fig. 14c
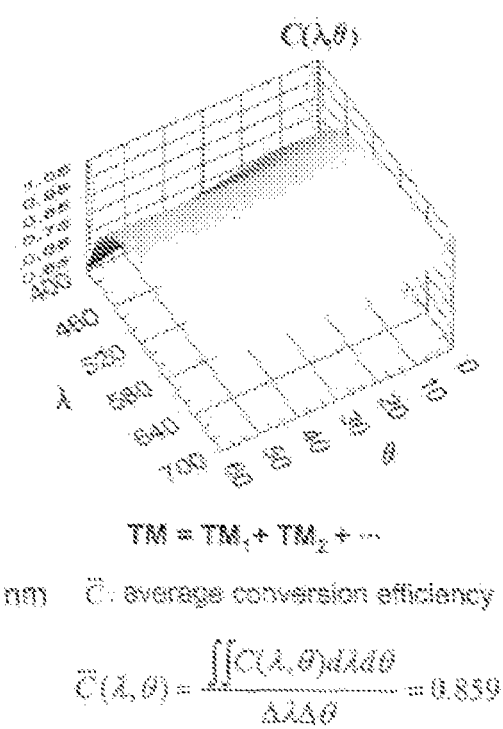

WIDE-ANGLE AND BROADBAND POLARIZATION CONVERTER

FIELD OF THE INVENTION

The present invention is related to converting unpolarized into linear polarized illumination for liquid crystal display (LCD) by using metallic gratings and a broadband polarization beam splitter (PBS), and more particularly to an apparatus, methods, systems and devices for efficient polarization conversion of wide-angle and broadband performance.

BACKGROUND AND PRIOR ART

In mainstream liquid crystal displays, such as thin-film-transistor liquid crystal display (TFT-LCD), the light is linearly polarized to obtain high contrast ratio. The light emitted from the back light unit, such as cold-cathode fluorescent lamp (CCFL) or light emitting diode (LED), are randomly polarized. As a result, a linear polarizer is needed in front of the LCD panel to select a preferred polarization that transmits the preferred polarization and absorbs tie unwanted one. A problem with this prior art configuration is that more than 50% of the incident light is wasted. In order to efficiently increase power utilization, a wide-angle broadband polarization beam splitter (PBS) is commonly used to recycle the light. One of widely used recycling systems consists of at PBS, a diffuser and a reflector, as shown in FIG. 1. Typically the PBS is a reflective linear-polarizing film produced by 3M under the brand name dual brightness enhancement film (DBEF). Instead of absorbing one polarization, the DBEF separates the incoming unpolarized beams into two linear polarizations, TE or TM, and lets one polarization, TM in this example, pass while reflecting the TE light in this example. The TE light is then depolarized by passing the diffuser and redirected back to PBS by the reflector. In some configurations, the reflector is also a diffuser such as ESR film manufactured by 3M. During a cycle, a portion of this depolarized light transmits through the PBS and the other part is reflected. Through many cycles, the brightness is enhanced for more TM light illuminating on LCD. Typically, the final light recycling efficiency is approximately 60-70%. The diffuser in this example plays the role of converting the TE light into unpolarized, or equivalently, the randomly polarized light. Ideally, if the TE is completely converted into TM light in one recycle, approximately 100% efficiency is obtained without considering absorption.

Several different prior art polarization conversions have been disclosed, one is U.S. Pat. No. 6,064,523 issued to Budd which replaces the diffuser with a quarter-wave plate inserted between the PBS and the reflection mirror. A respective 45 degree linear polarized beam passing through the quarter-wave plate results a right hand (RH) circular polarized wave. For a 90 degree polarization rotation to convert TE light into TM light, the reflected wave needs to be left hand (LR) circular polarized before re-entering the quarter-wave plate. Depending on the relative phase shifts introduced by the reflection mirrors, different mirrors need different arraignments of optical parts to produce LH wave. Two different configurations are shown in FIGS. 2 and 3 as examples. FIG. 2 shows a well known prior all configuration that uses a flat mirror directly reflecting RE circular polarized to LH circular polarized at normal incidence. FIG. 3 is a side view of the prior art structure of parabolic mirror and quarter-wave plate polarization recycle the liquid crystal displays as described in the Budd patent which works equally ell by double reflection with proper mirror-coating. The Budd patent provides detailed explanation of phase formula of parabolic mirror in the different embodiments.

In the above polarization conversion systems, the roles of each of the PBS, quarter-wave plate and reflector are respectively separating beams of different polarizations by the PBS, converting beam polarization is achieved by the Quarter-wave plate and; the reflector redirects the phase-shift beam back to the PBS. With application to direct-view LCD, this approach has three shortcomings. First, the incident angle to the quarter-wave film is usually not normal, thus, the outgoing light is not linear polarized, which limits the conversion efficiency. Second, the backlight is a broadband white light which means a broadband quarter-wave film is needed and its cost is increased. And third, the several recycles do not greatly increase the efficiency due to absorption loss and ineffective polarization conversion.

In tie present invention, the polarization conversion is achieved by the implementation of metallic or metallic-coated grating instead of using the combined quarter-wave plate and reflector, as shown in FIG. 4. More specifically, the metallic grating itself serves not only as a reflector, but also as a polarization converter. It rotates the incoming linear polarization light into elliptic polarized wave. The roles in the current reflective-grating polarization converter including a PBS for separating beams different polarizations and a metallic grating for redirecting, the beam back to PBS while converting the polarization of the beam.

Some metals that exhibit high reflectivity often can be used as broadband reflector. Thus, the redirection of light can be achieved by use of metal or metal-coated material in the grating-based polarization converter. The issue of how to rotate the beam polarization is addressed as following. Polarization conversion by metallic surface grating was experimentally observed, by G. P. Bryan-Brown and J. R. Sambles and published in Journal of Modern Optics, vol. 37, No. 7, P. 1227-1232 (1990). Further, a particular metallic grating structure was reported as broadband polarization-converting mirror in the visible spectral region by I. R. Hooper and J. R. Sambles in Optics Letter, vol. 27, No. 24, pp. 2152-2154 (2002).

In the earlier studies of metallic grating as polarization converter, the incident angle of the light beam was not the main concern in the scientific literature. However, to apply the metallic grating for enhancing the brightness of LCDs, the dependence of the incident angle needed to be rigorously explored because the rays emitted from the backlight unit of the LCD are propagating in all directions. In the present invention, a metallic grating is combined with the PBS to form a new type of resonator, called Polarization Rotation Resonator (PRR). The feature of PRR is a polarization converter with applicability to both broadband and wide-angle incident beams. Its polarization conversion efficiency is not too sensitive to tie incident angle and wavelength.

In the present invention, the insensitivity to angle and wavelength for efficient polarization conversion actually relies on the multi-bouncing of the beam inside the resonator. At each bouncing when the beam hits the metallic grating, not only is the beam reflected, but the polarization is converted too. As a result, each time a portion of the light is transmitted by the PBS and the total conversion is greatly improved even in a few bounces. We can then design the metallic grating to diffract light inside the PRR for several repetitive bouncing to get high conversion efficiency by adding all the converted rays out of PBS.

This structural configuration is similar to Fabry-Perot resonator where the total transmittance is obtained by adding up tall the rays bouncing out of the resonator. At the major region of wavelength, and incident angle, the polarization conversion is approximately 60% at the First bouncing and the overall conversion efficiency can reach above approximately 85%, as shown in FIGS. 11 and 14. Alternative types of diffraction grating with high reflection can be used as long as the polarization conversion is less sensitive to the beam wavelength and propagation direction. With such a nice characteristic, our PRR can actually serve as a broadband and wide-angle polarization converter and since the incident angle and wavelength are not necessarily limited to particular regions, in an embodiment, the resonator structure is replaced by a waveguide allowing the present invention to be used in alternative application where polarization conversion is required.

SUMMARY OF THE INVENTION

A primary objective of this invention is to provide an apparatus, methods, systems and devices for converting a randomly polarized light in the visible spectrum into a linear polarized light that provides polarized illumination for liquid crystal displays.

A second objective of this invention is to provide new methods, systems, apparatus and devices for broadband or monochromatic light of any propagation directions and any spectra when polarization conversion is needed.

A first embodiment provides a polarization converter comprising a polarization beam splitter for receiving an input light beam, passing a transverse magnetic wave through the polarization beam splitter and reflecting a transverse electric wave and includes a diffraction grating having a reflectivity and polarization convertible grating for receiving the transverse electric field wave reflects back an elliptically polarized wave having a polarization rotation. The polarization beam splitter can be alternative optical elements such as a prism or an optical device having multi-layered films. The diffraction grating can be a diffraction grating having alternating parallel protrusions and recesses, a metallic diffraction grating, a metal-coated diffraction grating, a metal-coated multi-layered diffraction grating, a non-metallic reflective material, a surface grating, a volume grating, a multi-layer grating, a diffractive grating having sub-wavelength grating periods or a diffractive grating having multi-orders diffraction gratings. The diffraction grating can have alternative shapes such as binary, trapezoidal, sinusoidal, parabolic, triangular and Gaussian shape.

A second embodiment provides a method for efficient polarization conversion of a light beam including the steps of receiving a light beam at a polarization begun splitter, passing a transverse magnetic wave through the polarization beam splitter, reflecting a transverse electric wave from the polarization beam splitter to a diffraction grating, reflecting an elliptically polarized wave from the diffraction grating back to the polarization beam splitter, receiving the reflected elliptically polarized light at the polarization beam splitter and repeating the steps for multiple-bouncing between the polarization beam splitter and the diffraction grating to achieve high polarization conversion efficiency. In an embodiments a profile of the diffraction grating is selected for a particular application. In another embodiment, the polarization converter is used to provide a polarized illumination for a liquid crystal display and in yet another embodiment, the polarization beam splitter is aligned in parallel with the diffraction grating to form a polarization rotation parallel resonator.

Further objects and advantages of this invention will be apparent from the following detailed description of preferred embodiments that are illustrated schematically with accompanied drawings.

BRIEF DESCRIPTION OF THE FIGS.

FIG. 9a is a side view of an example of a binary type metallic sub-wavelength grating in polarization rotation resonator.

FIG. 9b is a side view of the binary type metallic sub-wavelength grating of FIG. 9a and a polarization beam splitter showing the polarized and unpolarized light transmission.

FIG. 10a is a side view of an example of a broadband wide-angle polarization converter configuration with multi-diffraction order gratings shown in FIG. 8.

FIG. 10b is a side view of the binary metallic sub-wavelength grating.

FIG. 10c shows the total polarization conversion efficiency of one-time bouncing in polarization rotation resonator with the grating configuration shown in FIG. 8.

FIG. 11a is a side view of an example of a broadband wide-angle polarization converter configuration with multi-diffraction order gratings shown in FIG. 8.

FIG. 11b is a side view of the binary metallic sub-wavelength grating.

FIG. 11c shows the total polarization conversion efficiency of infinite bouncing in polarization rotation resonator with the grating configuration shown in FIG. 8.

Figure 12:
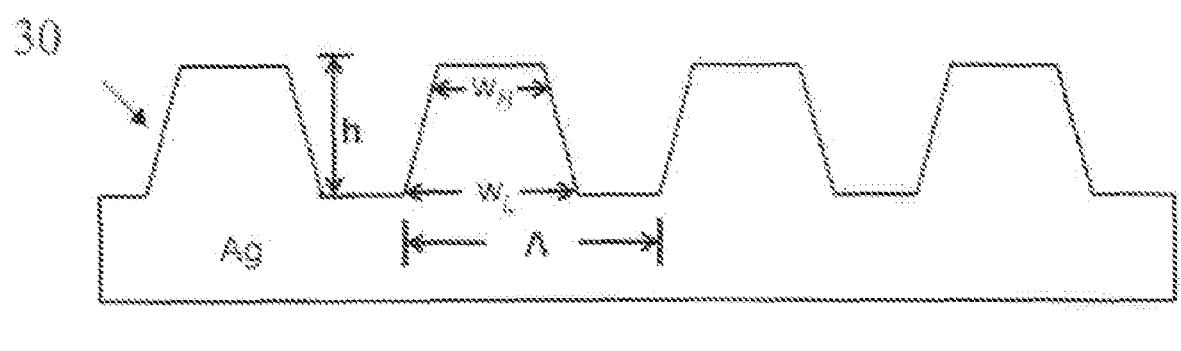
FIG. 12 is a side view of a trapezoid type of metallic sub-wavelength grating in polarization rotation resonator.
Figure 13A:
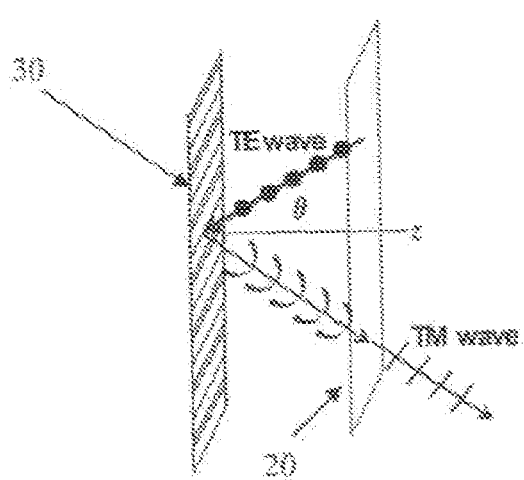

FIG. 13a a side view of a polarization rotation resonator with trapezoid metallic sub-wavelength grating shown in FIG. 12.

Figure 13B:
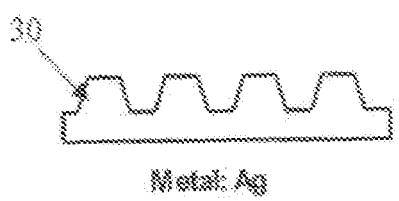

FIG. 13b is a side view of the trapezoid metallic sub-wavelength grating shown in FIG. 12.

Figure 13C:
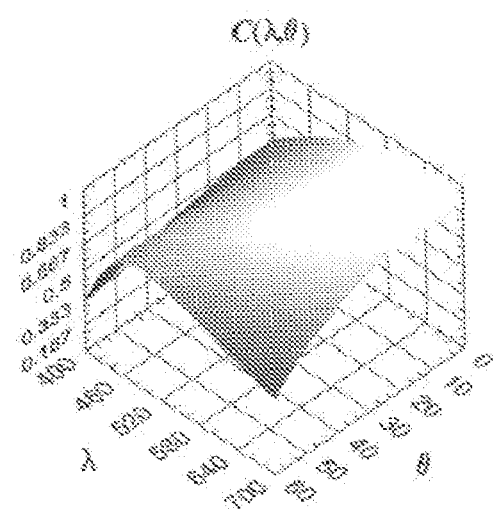

FIG. 13c shows the polarization conversion efficiency of one-time bouncing in polarization rotation resonator with trapezoid metallic sub-wavelength grating shown in FIG. 12.

FIG. 14a is a side view of a polarization rotation resonator with trapezoid metallic sub-wavelength grating shown in FIG. 12.

FIG. 14b a side view of the trapezoid metallic sub-wavelength grating shown in FIG. 12.

FIG. 14c shows the total polarization conversion efficiency of infinite bouncing in polarization rotation resonator with grating configuration shown in FIG. 12.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of designators used in the description, and the figures to identify components of the present invention.

10 diffraction grating
20 polarization beam splitter
30 trapezoid type of sub-wavelength diffractive grating The present invention provides alternative polarization converter configurations which can be applied to wide-angle broadband beams for the purpose of polarized illumination or to single wavelength light guided in a particular direction. The polarization converter includes a diffractive grating and a polarization beam splitter film (PBS). The function the polarization converter depends on the type of diffractive grating and PBS used and on the arrangement of the two components. The following examples are provided to illustrate the operational characteristics of the polarization converter with alternative component configurations and alternative arrangements of the components.

Figure 1:
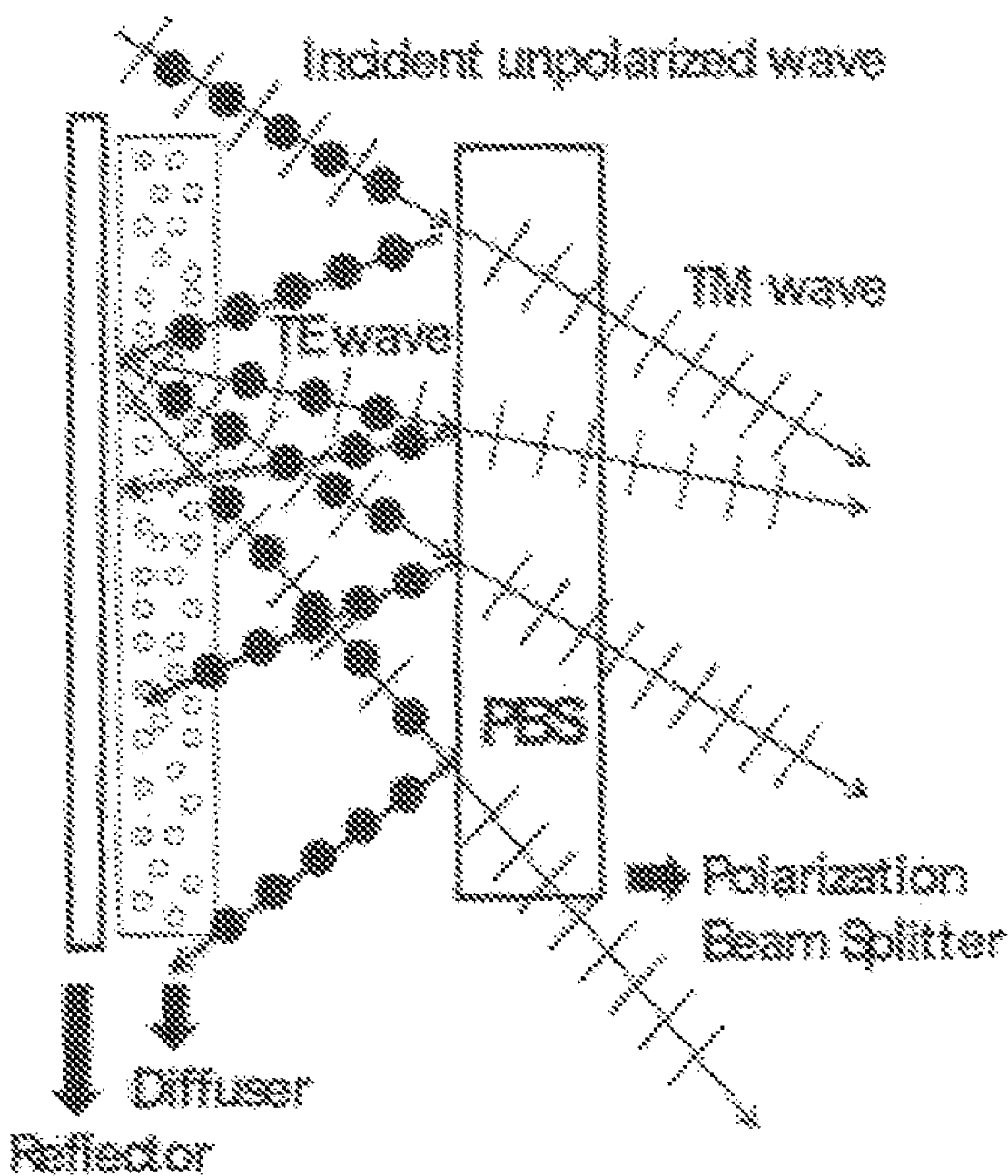
FIG. 1 is the structure of conventional polarization recycler for LCDs.
Figure 2:
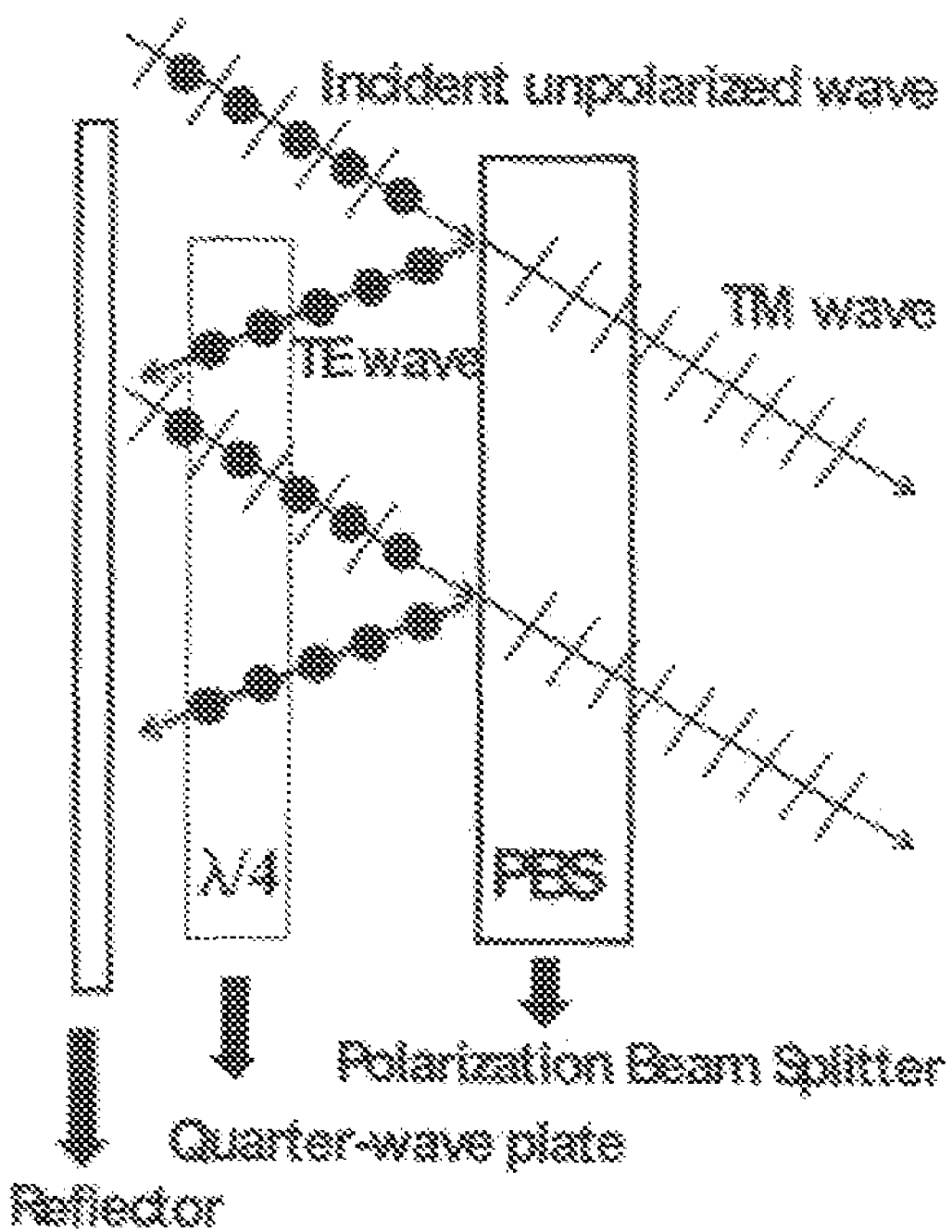
FIG. 2 is the structure of flat mirror and quarter-wave plate polarization recycler for LCDs.
Figure 3:
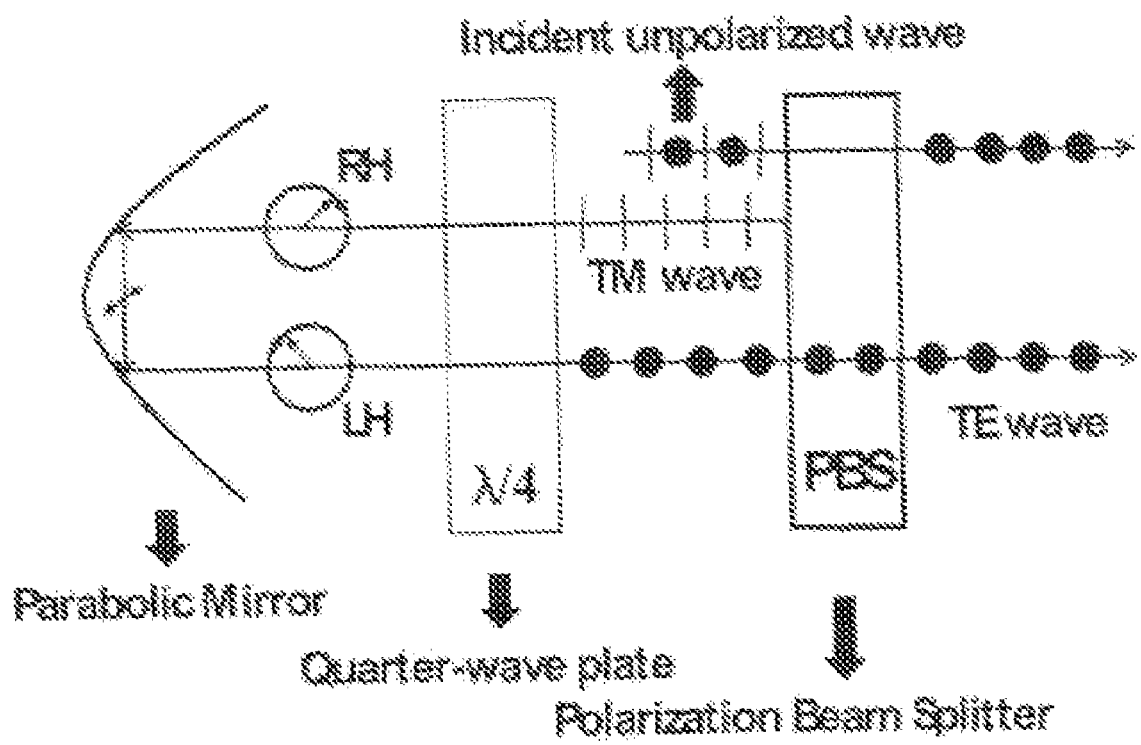
FIG. 3 is a side view of a prior art structure of parabolic mirror and quarter-wave plate polarization recycler for liquid crystal displays.
Figure 4:
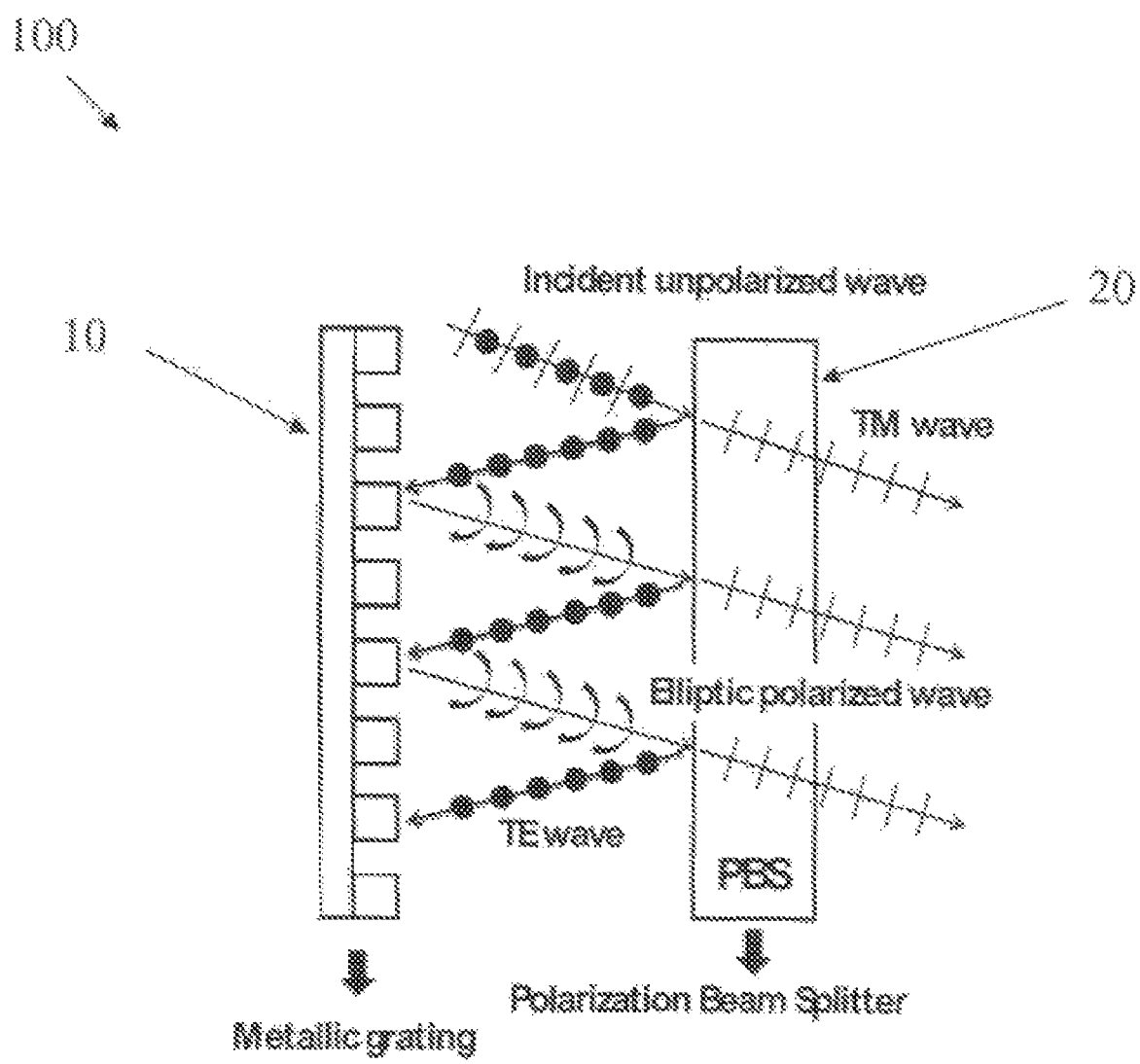
FIG. 4 is a side view of an example of a broadband wide-angle polarization converter according to the present invention for liquid crystal displays.
Figure 5:
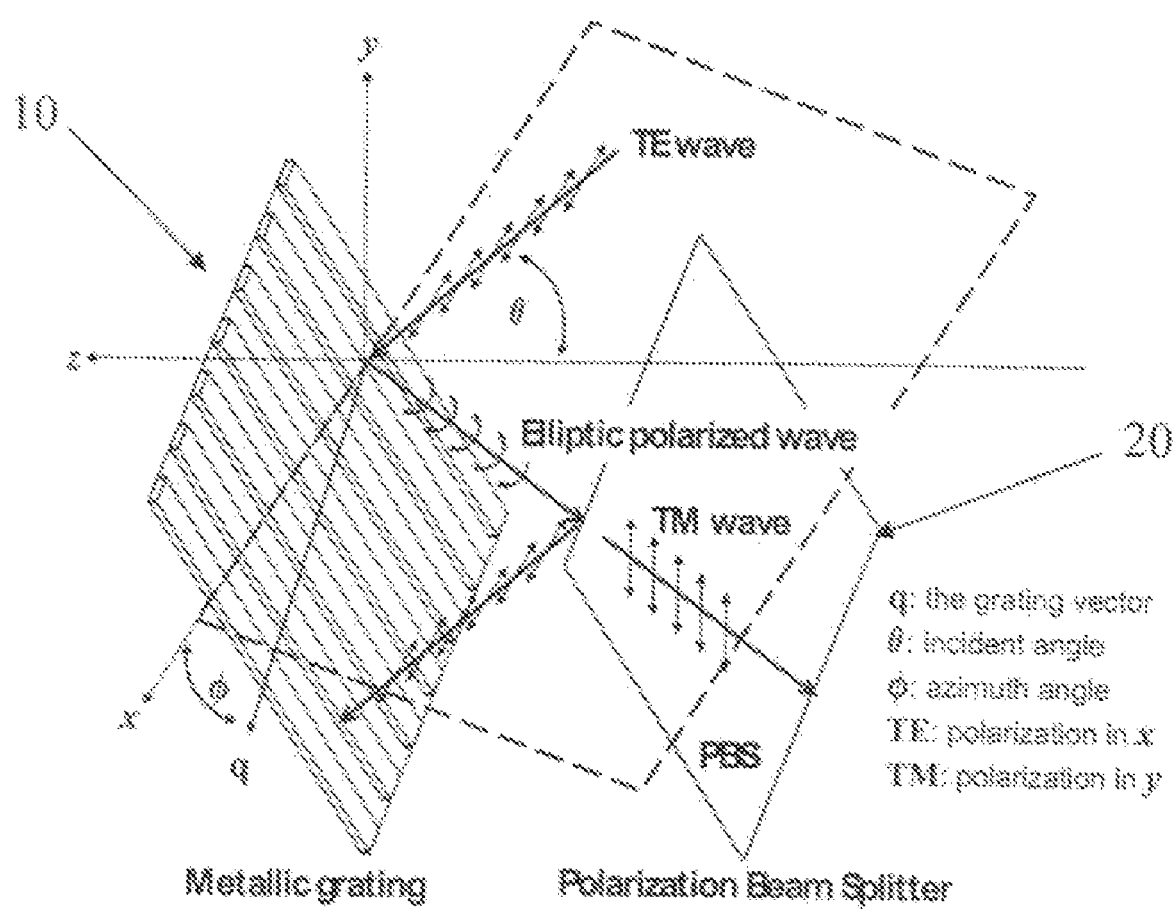
FIG. 5 is a perspective view of the configuration of Polarization Rotation Resonator (PRR) according to the present invention showing the operational characteristics.

FIG. 4 is a side view of an example of a broadband wide-angle polarization converter according to the present invention. With parallel alignment of a sub-wavelength diffractive grating, a metallic grating in this example, and a PBS the two components form a new type of resonator, referred to throughout the specification as a Polarization Rotation Resonator (PRR). FIG. 5 is a perspective view of the configuration of polarization rotation resonator according to the present invention showing the operational characteristics. The input beam is first incident on the PBS, which, allows tie transverse magnetic field (TM),polarized wave to pass through and reflects back the transverse electric field (TE) polarized wave toward the sub-wavelength metallic grating. Usually the input lights are unpolarized beams, so the TE and TM waves shares approximately one-half of the total power each. The primary solution to the problems encountered by the prior art is the conversion of the TE wave into a light wave.

As indicated in the prior art scientific literature above mentioned, the metallic grating 10 rotates the polarization vector of the TE wave to a particular degree with a particular phase delay between its two orthogonal components. The rotation of polarization depends not only on the metallic grating 10 profile but also the orientation of the grating vector related to the polarization vector of the incident TE wave. The azimuthal angle between the two vectors is typically approximately 45 degree for a maximum polarization rotation because the interaction of light with the surface plasmon on the metallic grating is the strongest and produces the polarization rotation. Due to the phase delay between the two orthogonal polarizations of the diffracted wave, the TE incident wave becomes an elliptically polarized wave after it is reflected from the metallic grating.

The reflected elliptically polarized wave is a mixture of its two orthogonal components, a mixture of HE and TM waves with a phase, difference. It means the polarization is rotated from pure TE wave to a superposition of TE and TM waves.

The conversion efficiency of one time bouncing is defined as the power of the TM component of the reflected elliptical wave divided by the power of the incident pure TE wave. Of course, some wave energy is lost since the metal used for the metallic grating is not an ideal perfect conductor. The polarization conversion efficiency is determined both by the absorption and polarization rotation during the interaction with the metallic grating.

Figure 6:
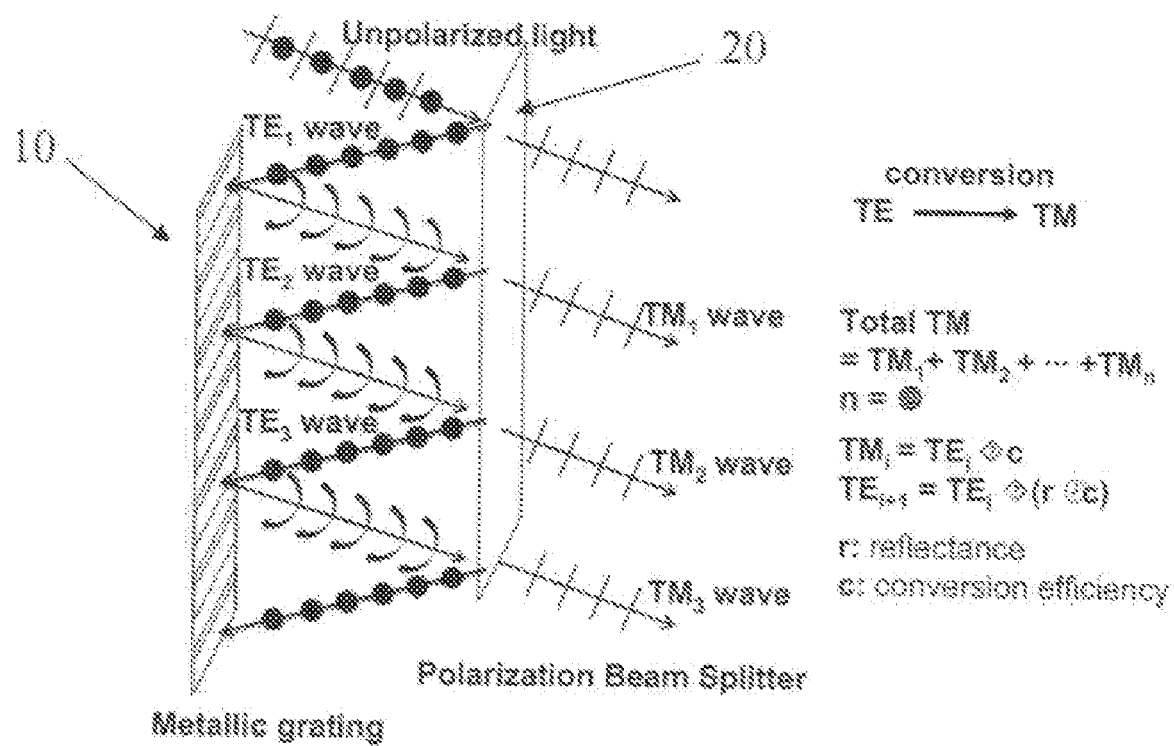
FIG. 6 is a side view of the Polarization Rotation Resonator showing the operational principle of the polarization rotation resonator.

After the elliptically polarized light reaches the PBS 20, the TM component passes through and the TE component is again reflected back. This is the process of one cycle of bouncing. Because the sub-wavelength metallic grating is selected to only to diffract light to the zeroth order, the propagation of the light inside the PPR follows Snell's law. Therefore, the polarization conversion efficiency for every bouncing is the same. This property enables calculation of the total polarization conversion efficiency after infinite bouncing, similarly to the Fabry-Perot resonator mentioned earlier. FIG. 6 shown an, example of the total polarization conversion obtained by adding up the infinite bouncing.

FIG. 9a shows a preferred embodiment with the sub-wavelength metallic grating being a binary type metallic grating. FIG. 9b is a side view of the binary type metallic sub-wavelength grating of FIG. 9a with a polarization beam splitter showing the polarized and unpolarized light transmission. The material used for the diffraction metallic grating in this example is Ag (silver), with all the dispersion relation (function of index of refraction to wavelength) used in calculating the polarization conversion. The incident wavelength and angle ranges for visible light are between 400 to 700 nm and 0 to 60 degree.

FIG. 10a is a side view of an example of a broadband wide-angle polarization converter configuration, with metallic binary grating shown in FIG. 9 and FIG. 10b is a side view of the metallic binary grating. The total polarization conversion efficiency of one-time bouncing in polarization rotation resonator with the metallic binary grating shown in FIG. 9 is shown in FIG. 10c. FIG. 11a is a side view of an example of a broadband wide-angle polarization converter configuration with a metallic binary grating shown in FIG. 9 and FIG. 11b is another side view of the multi-diffraction order metallic grating. The total polarization conversion efficiency of infinite bouncing in polarization rotation resonator with the metallic binary grating is shown in FIG. 11c.

In another preferred embodiment, a trapezoid type of sub-wavelength metallic grating is used in the polarization rotation resonator. FIG. 12 is a side view of a trapezoid type, of metallic sub-wavelength grating polarization rotation resonator and FIG. 13a is a side view of a polarization rotation resonator With trapezoid metallic sub-wavelength grating. FIG. 13b is another side view of the trapezoid metallic sub-wavelength grating aid the polarization conversion efficiency of one-time bouncing in the polarization rotation resonator with trapezoid metallic sub-wavelength grating shown in FIG. 13c. Similarly, FIG. 14a is another side view of a polarization rotation resonator with the trapezoid metallic sub-wavelength grating shown in FIG. 14b. The total polarization conversion efficiency of infinite bouncing in polarization rotation resonator with trapezoid metallic sub-wavelength grating is shown in FIG. 14c.

While the two examples of metallic gratings used in polarization rotation resonator of the present invention to provide improved polarization performance alternative metallic grating profiles and materials can be substituted within the scope of the present invention. The binary and trapezoid metallic gratings are shown and described for purpose of explanation of the subject, invention and not as a limitation. Alterative metallic gratings such as gratings of binary, trapezoidal, sinusoidal, parabolic, triangular, and Gaussian shape can be substituted within the scope of the present invention as long as the alternative grating has a high reflectivity and food polarization conversion.

Figure 7:
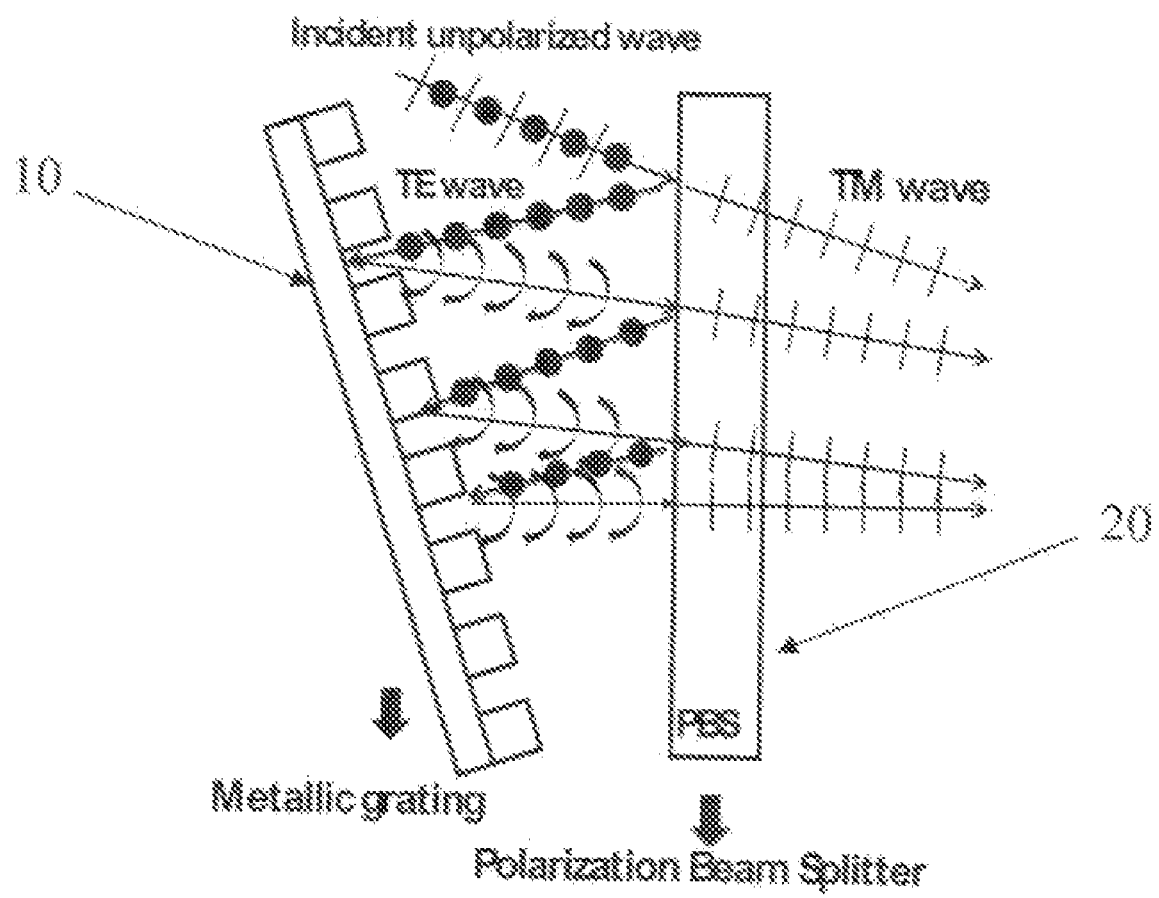
FIG. 7 is a side view of an example of a configuration of broadband wide-angle polarization converter having a waveguide-like structure.
Figure 8:
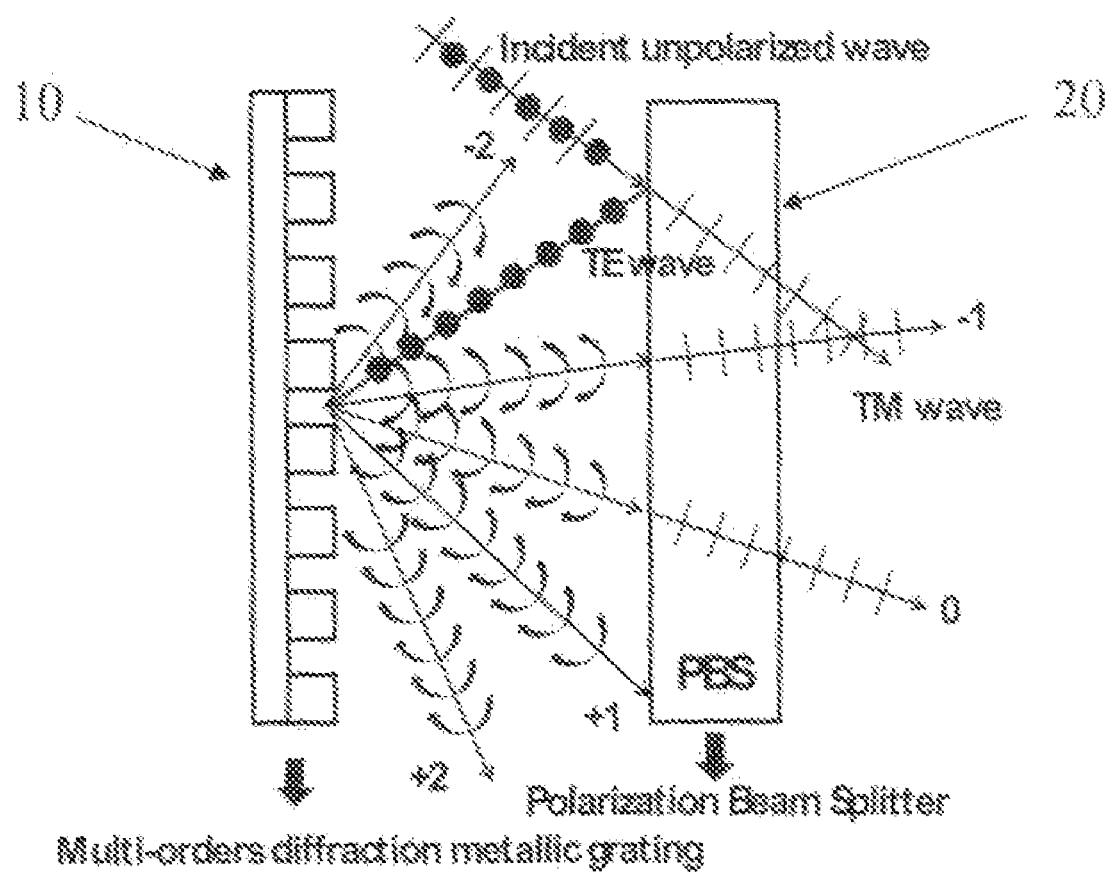
FIG. 8 is a side view of an example of a broadband wide-angle polarization converter configuration with multi-diffraction order gratings.

With implementation of metallic or metallic-coated surface grating and a broadband PBS, a wide-angle broadband polarization converter such as the PPR shown in FIGS. 4-6. The combination of metallic gratings and a polarization beam splitter is not necessarily in the form of parallel resonator. And the metallic diffraction grating is not limited to sub-wavelength grating; it could be a grating with many non-evanescent diffraction orders. FIGS. 7 and 8 are examples of alternative configurations of the wide-angle broadband polarization converter of the present invention. In FIG. 7, instead of parallel resonator, a cavity of waveguide-like structure is used to glide the transmitted wave in the desired direction in FIG. 8, a metallic grating is designed to diffract light into different propagation orders (from −2 to +2) for purpose of uniform distribution of brightness. In all embodiments of the present invention, the novel characteristic is providing an environment for light to experience multi-bouncing between the reflection grating and PBS resulting in high total polarization conversion. Alterative arrangement of the two optical elements, the metallic grating and PBS, to accomplish polarization conversion will be obvious to those skilled in the art using the disclosure described and shown in the subject specification for a designer to select a suitable device configuration to achieve a desired performance.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A polarization converter comprising: a polarization beam splitter for receiving a light beam, passing a first polarization wave of the light beam through the polarization beam splitter, and reflecting a second polarization wave of the light beam; and
    a diffraction grating having a reflectivity and a polarization convertible grating for receiving the second polarization wave and reflecting back an elliptically polarized wave having a polarization rotation.
2. The polarization convener of claim 1, wherein the first polarization wave is as transverse magnetic wave, and the second polarization wave is a transverse electric wave.
3. The polarization converter of claim 1, wherein the broadband wide-angle polarization beam splitter comprises:
    a prism.
4. The polarization converter of claim 1, wherein the polarization beam splitter comprises:
    an optical device having multi-layered films.
5. The polarization converter of claim 1, wherein the diffraction grating comprises:
    a diffraction grating having alternating parallel protrusions and recesses.
6. The polarization converter of claim 1, wherein the diffraction grating comprises:
    a metallic diffraction grating.
7. The polarization converter of claim 1, wherein the diffraction grating comprises:
    a metal-coated multi-layered diffraction grating.
8. The polarization converter of claim 1, wherein the diffraction grating comprises:
    a non-metallic reflective material diffraction grating.
9. The polarization converter of claim 1, wherein the diffraction grating comprises:
    a surface grating.
10. The polarization converter of claim 1, wherein the diffraction grating comprises:
    a volume grating.
11. The polarization converter of claim 1, wherein the diffraction grating comprises:
    a multi-layer grating.
12. The polarization converter of claim 1, wherein the diffraction grating comprises:
    a diffractive grating having sub-wavelength grating periods.
13. The polarization converter of claim 1, wherein the diffraction grating comprises:
    a diffractive grating having non-evanescent diffraction orders.
14. The polarization converter of claim 1, wherein the diffraction grating comprises:
    a diffractive grating having multi-orders diffraction grating.
15. The polarization converter of claim 1, wherein a shape of the diffraction grating is selected from a group consisting of:
    binary-shaped gratings, trapezoidal-shaped gratings, sinusoidal-shaped gratings, parabolic-shaped gratings and Gaussian-shaped gratings.
16. The polarization converter of claim 1, wherein the polarization beam splitter comprises:
    a waveguide cavity structure to guide the transmitted wave in the desired direction for polarization conversion.
17. A method for efficient polarization conversion of a light beam comprising the steps of:
    receiving a light beam at a polarization beam splitter;
    passing a first polarization wave of the light beam through the polarization beam splitter;
    reflecting a second polarization wave of the light beam from the polarization beam splitter to a diffraction grating;
    reflecting an elliptically polarized wave from the diffraction grating back to the polarization beam splitter;
    receiving the reflected elliptically polarized light at the polarization beam splitter; and
    repeating the steps for multiple-bouncing between the polarization beam splitter and the diffraction grating to achieve high polarization conversion efficiency.
18. The method of claim 17, wherein the elliptically polarized wave having a mixture of the first polarization wave component and second polarization wave component with a phase difference.
19. The method of claim 17, wherein the first polarization wave means transverse magnetic wave, and the second polarization wave means transverse electric wave.
20. The method of claim 17, further comprising the step of:
    aligning the polarization beam splitter in parallel with the diffraction grating to form a polarization rotation parallel resonator.

* * * * *